United States Patent [19]

Horvath

[11] 4,209,161

[45] Jun. 24, 1980

[54] COLLAPSIBLE CORE FOR CASTING MOLDS

[75] Inventor: Johann Horvath, Trautmannsdorf, Austria

[73] Assignee: Wien-Fischamender Metallwarenfabrik Josef Suschny & Sohne, Fischamend, Austria

[21] Appl. No.: 955,242

[22] Filed: Oct. 27, 1978

[30] Foreign Application Priority Data

Nov. 3, 1977 [AT] Austria .................................... 7856/77

[51] Int. Cl.² ...................... B29F 1/002; B29D 23/02; B29F 1/08; B29C 1/06
[52] U.S. Cl. ..................................... 249/180; 249/184
[58] Field of Search ............... 249/178, 180, 184, 186, 249/59; 425/438, DIG. 58, 577

[56] References Cited

U.S. PATENT DOCUMENTS

| | | | |
|---|---|---|---|
| 2,676,372 | 4/1954 | Venner et al. | 249/180 |
| 3,247,548 | 4/1966 | Fields et al. | 249/184 X |
| 3,339,242 | 9/1967 | Lamb | 249/180 X |
| 3,482,815 | 12/1969 | Naturale | 249/180 |
| 3,677,684 | 7/1972 | Platz | 425/393 X |
| 3,853,299 | 12/1974 | Kessel | 249/184 X |
| 3,856,256 | 12/1974 | Celesti | 249/184 X |
| 3,966,385 | 6/1976 | Spears | 249/180 X |
| 4,019,711 | 4/1977 | Altenhof et al. | 249/180 X |

Primary Examiner—J. Howard Flint, Jr.
Attorney, Agent, or Firm—Cushman, Darby & Cushman

[57] ABSTRACT

A collapsible mold core comprises an inner core member, which remains out of contact with the inside peripheral surface of the molding, first and second pairs of mutually opposite, outer core members, which engage the molding and determine the shape thereof, and guides which converge toward the axis of the core and serve to guide the pairs of outer core members parallel to guide planes which are offset 90° from each other and extend through the axis of the core. The four outer core members tightly adjoin each other, and the outer core members of the first pair have lateral wedge faces which extend parallel to the guides and at right angles to the guide plane of the outer core members of the second pair. The latter have inclined surfaces which are disposed on the side which faces the axis and are parallel to the wedge faces of the other outer core members, and the outer core members of both pairs are adapted to be displaced from a molding position in that longitudinal direction of the guides in which the latter converge. The displacement of the outer core members of the first pair is smaller than the displacement of the outer core members of the second pair.

13 Claims, 14 Drawing Figures

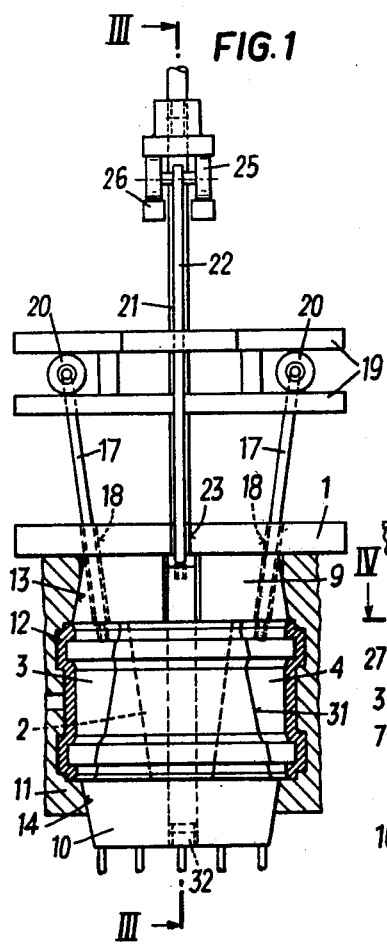
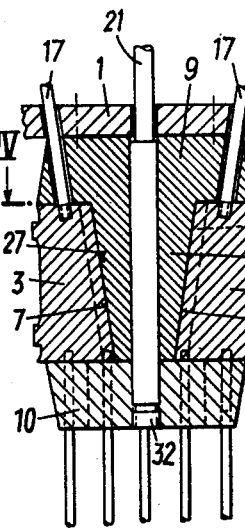
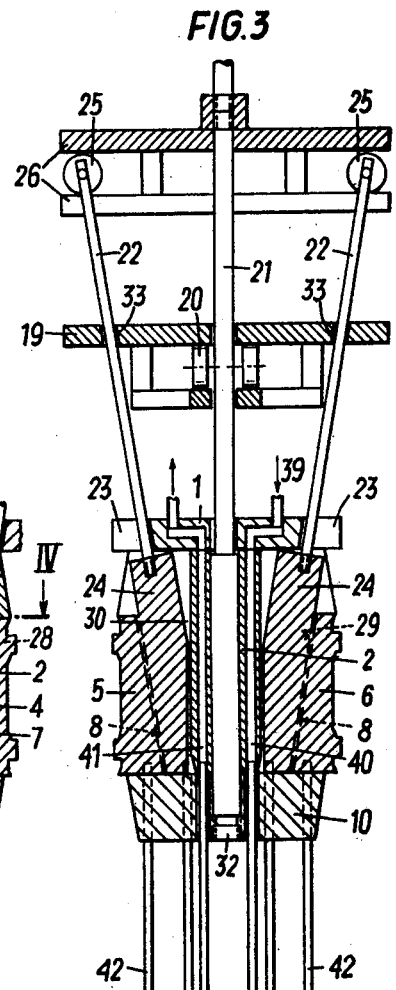
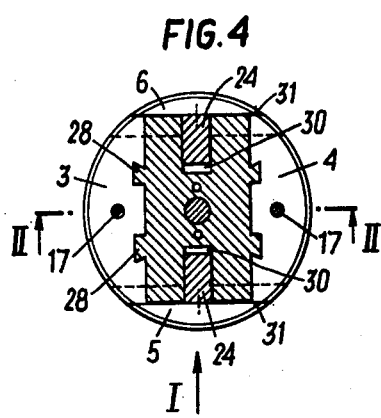

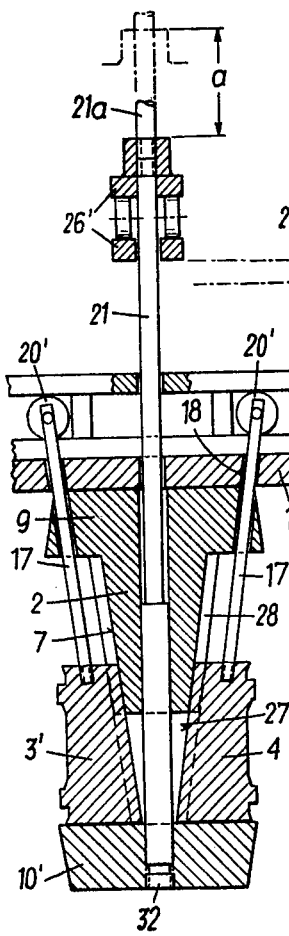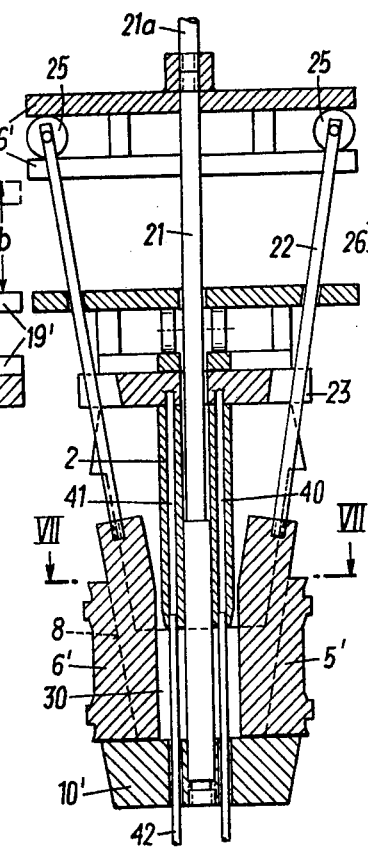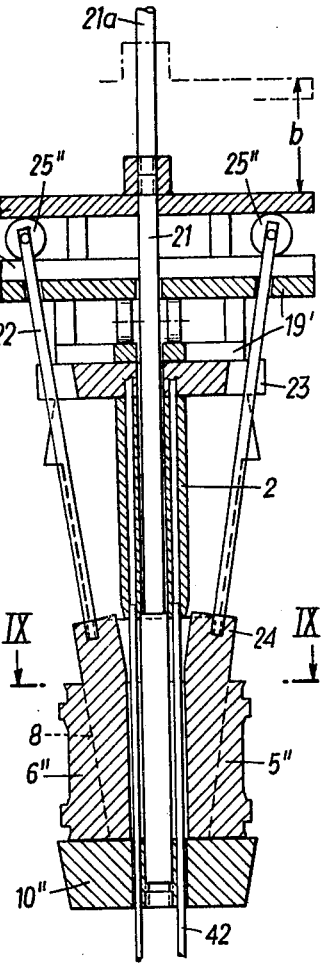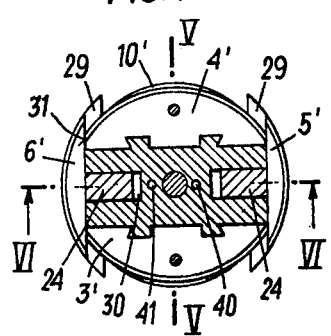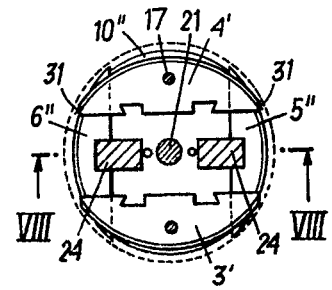

COLLAPSIBLE CORE FOR CASTING MOLDS

This invention relates to a collapsible core for use in casting molds for the manufacture of moldings which are formed with undercuts on their inside surface, such as sleeves, which core comprises at least one inner core member, which remains out of contact with the inside peripheral surface of the molding, core member first and second pairs of mutually opposite, outer core members, which contact the molding and determine the shape thereof, and guides which converge toward the axis of the core and serve to guide said pairs of outer parts parallel to guide planes, which are offset 90° from each other and extend through the axis of the core.

Such collapsible cores are known per se and are collapsed so that the core can be extracted from a mold used to form a molding which has an internal undercut. The known collapsible cores of this kind are either most complicated and, as a result, liable to be deranged, or can be extracted from the mold only by a plurality of operations, part of which must be performed by hand.

It is an object of the invention to improve such a collapsible core. The invention resides essentially in that the four outer core members which surround the inner core member tightly adjoin each other, the outer core members of the first pair have lateral wedge faces, which extend parallel to the guides and at right angles to the guide plane of the outer core members of the second pair, the outer core members of the second pair have inclined surfaces which are disposed on the side which faces the axis and are parallel to the wedge faces of the outer core members of the first pair, the outer core members of both pairs are adapted to be displaced from a molding position in that the longitudinal direction of the guides in which the latter converge, and the displacement of the outer core members of the first pair is smaller than the displacement of the outer core members of the second pair.

The invention provides a core which comprises only four positively controlled outer core members, which are guided while being held to the inner core member, and eliminates the need for additional outer core members which can be inserted and removed by hand, as is known in a known apparatus for making integral vessels of thermoplastic material. The invention also eliminates the need for separate drives for individual movable core members. Such drives would give rise to problems relating to the coordination of the control means for the drives and the exact guidance of the several core members.

In the collapsible core according to the invention the first part of the displacement causes the outer core members of both pairs to be jointly displaced by the same distance. Because the displacement of the outer core members of the first pair should be smaller than the displacement of the outer core members of the second pair, the outer core members of the second pair are subsequently displaced alone. As the outer core members of the fist pair have lateral wedge faces and the outer core members of the second pair have inclined surfaces, which engage said wedge faces, the first part of the displacement causes the outer core members of the first pair to be moved inwardly along said inclined surfaces of the outer core members of the second pair so that the diameter of the core is decreased at the outer core members of the first pair. During the second part of the displacement, only the outer core members of the second pair are displaced in the direction of convergence. Because this movement is performed in the longitudinal direction of the converging guides and along the wedge faces of the outer core members of the second pair, the outer core members of the second pair are thus moved inwardly and the diameter of the core is decreased also at the outer core member of the second pair. When this displacement has been completed, the diameter of the core has been decreased on all sides to such an extent that the molding is released. The extent to which the diameter of the core is decreased is determined by the angle of convergence of the converging guides and of the wedge faces and inclined surfaces and by the extent of the displacement. It is apparent that the invention permits of a substantial decrease of the diameter of the core when it is desired to remove the molding from the mold so that the manufacture of hollow moldings having very deep undercuts on their inside surface is enabled. This large decrease of the diameter of the core as it is extracted also permits the manufacture of moldings which are provided on their inside surface with protruding parts, such as ribs, because the diameter of the core can be decreased to such an extent during its extraction that the core releases even such large projections.

In a preferred embodiment of the invention, the guides consist of guide rods, which are known per se and are rigidly connected to the outer core members, the guide rods associated with the outer core members of the first pair are mounted in a baseplate and guided in the latter for movement in their longitudinal direction and have free ends which in a first transverse guide are held against a movement in the axial direction of the core and slidably guided in a radial direction, the guide rods associated with the outer core members of the second pair are guided in their longitudinal direction in the first transverse guide and have free ends which in a second transverse guide are held against a movement in the axial direction of the core and slidably guided in a radial direction, and the transverse guides are slidably guided in the axial direction of the core. Because the guide rods are guided along inclined paths and the outer core members are moved inwardly during their displacement, the latter changes the radial distance between the free ends of the guide rod and causes these free ends to approach each other. Within the scope of the invention rollers or rolling element bearings may be interposed between the free ends of the guide rods and the transverse guides. These transverse guides are used to impart the axial displacement to the outer core members during the extraction of the core from the mold.

In a preferred embodiment of the invention, the actuating means for axially displacing the outer core members engage the transverse guide which cooperates with the guide rods associated with the outer core members of the second pair, the transverse guide which cooperates with the guide rods associated with the outer core members of the second pair is axially spaced from the transverse guide cooperating with the guide rods associated with the outer core members of the first pair when the core is in molding position, and the transverse guide which cooperates with the guide rods associated with the outer core members of the second pair engages and takes along the transverse guide cooperating with the guide rods associated with the outer core members of the first pair when the outer core members of the second pair have performed a first part of their axial displacement. This simple arrangement ensures that the displacement of the outer core members of the first pair is smaller than the displacement of the outer core members of the second pair and, as is desired, the outer core members of the first pair are drawn inwardly first and the outer core members of the first second pair are subsequently drawn inwardly along the outer core members of the first pair.

As the guide rods are sufficient for guiding the outer core members, the inner core member may be designed so that it contacts the outer core members only in part or does not contact them at all. On the other hand, it is desirable to provide an inner core member which is formed with two opposite inclined surfaces which are parallel to the wedge faces of the outer core members of the first pair, and with two opposite inclined surfaces which are parallel to the inclined surfaces of the outer core members of the second pair, which inclined surfaces of the inner core member contact the wedge faces and inclined surfaces, respectively, of the outer core members at least when the core is in molding position. This ensures a precise positioning of the outer core members in the molding position. The inclined surfaces of the inner core member may also assist the guidance of the outer core members during their axial displacement. The outer core members of the first pair may be guided on the inclined surfaces of the inner core member, e.g., by means of dovetail guides, so that a precise guidance of the outer core members of the first pair and, as a result, an improved guidance of the outer core members of the second pair is ensured.

According to a preferred feature of the invention the two axial ends of the outer core members are covered by conical covers which taper outwardly and which cooperate with hollow conical surfaces of the mould when the core is in molding position. Owing to the cooperation of these conical covers and of the mold, the position of the outer core members in the closed mold will be exactly controlled and the core members will be axially clamped by the conical covers so that the outer core members will be exactly held in position during the injection molding operation. Within the scope of the invention, one of the conical covers, suitably the one which is remote from the free ends of the guide rods, is formed with centering means, which consist, e.g., of an annular centering rim and which cooperate with the outer core members of at least one pair. This feature will further improve the holding of the outer core members in position during the injection molding operation.

Within the scope of the invention the conical cover which faces the free ends of the guide rods is desirably rigidly connected to the baseplate and the inner core member. Also within the scope of the invention, the conical cover which is disposed at that end of the outer core members that is remote from the free ends of the guide rods is preferably connected by a central guide rod to the transverse guide which cooperates with the guide rods associated with the outer core members of the second pair, and said central guide rod extends axially through the baseplate and the inner core member. As a result, that cover is properly guided as the core is extracted from the mold.

The outer core members are suitably provided in known manner with coolant passages. The arrangement is preferably such that the coolant passages have openings in those end faces of the outer core members which are remote from the baseplate, and conduits or pipes extending parallel to the axis of the core are connected to said openings. In a desirable arrangement, supply and return conduits for the coolant extend through the cover which faces the baseplate and through the inner core member and emerge at that end face of the inner core member which is remote from the baseplate and extend also through the conical cover which is remote from the baseplate, and the latter conical cover is axially displaceable relative to said conduits. In that arrangement the cooling water is supplied from and returned to the end at which the baseplate is disposed so that there is no need for supply and drain conduits at that end of the core which is remote from the baseplate and the moldings can be removed from the mold. The conduits which connect the passages in the several outer core members may easily be designed so that they do not protrude beyond the smallest diameter of the core so that even these connecting conduits do not obstruct the removal of the molding.

An illustrative embodiment of the invention is diagrammatically shown on the drawing.

FIGS. 1 to 4 show the core in molding position.

Specifically, FIG. 1 is an elevation showing the core viewed in the direction of the arrow I in FIG. 4, the mold and the molding being additionally shown in section.

FIG. 2 is a sectional view taken on line II—II in FIG. 4;

FIG. 3, a section view taken on line III—III in FIG. 1, and,

FIG. 4 a sectional view taken on line IV—IV in FIG. 2.

FIGS. 5, 6, and 7 show the core in the position reached after the first part of the extracting movement, i.e., when the outer core members have performed the first part of their displacement.

Specifically, FIG. 5 is a sectional view taken on line V—V in FIG. 7,

FIG. 6 a sectional view taken on line VI—VI in FIG. 7, and,

FIG. 7 a sectional view taken on line VII—VII in FIG. 6.

FIGS. 8 and 9 show the core in its position reached after the second part of its collapsing movement, i.e., when the displacement of the outer core members has been completed.

Specifically, FIG. 8 is a sectional view taken on line VIII—VIII of FIG. 9 and,

FIG. 9 a sectional view taken on line IX—IX in FIG. 8.

FIGS. 10 and 11 are enlarged views showing the non-extracted core.

Specifically, FIG. 10 is like FIG. 2, a sectional view taken on line II—II in FIG. 4 and, FIG. 11 like FIG. 3, a sectional view taken along line III—III in FIG. 1.

Figure 10:
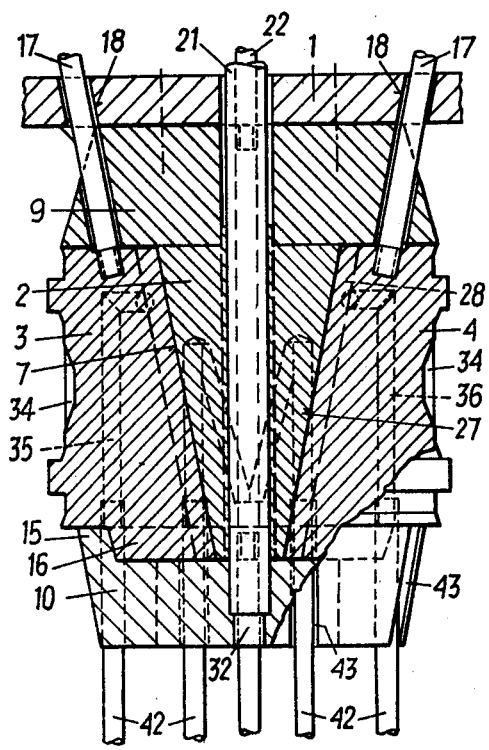
Figure 11:
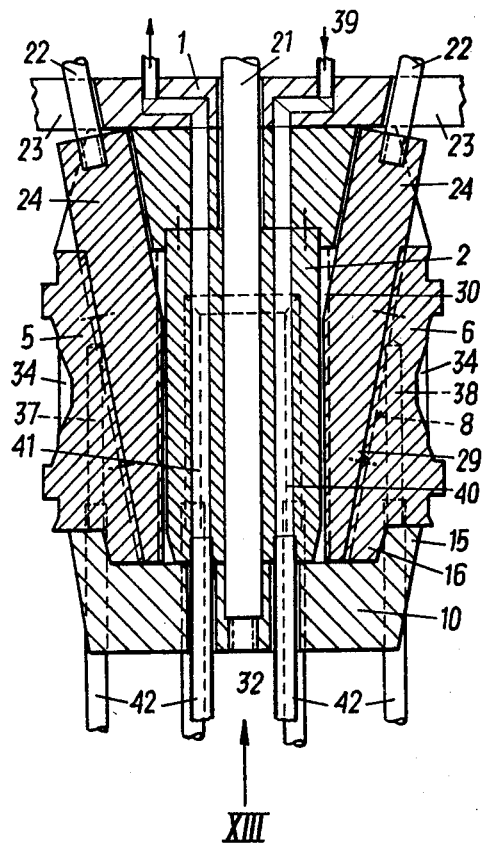

In FIGS. 1 to 4, a stationary baseplate 1 is apparent. Two pairs of outer core members 3, 4 and 5, 6 engage an inner core member 2, which tapers downwardly in the axial direction of the core. The terms "down" and "up" refer to the drawing. The inner core member 2 has inclined surfaces 7 in contact with the outer core members 3, 4 of the first pair, and inclined surfaces 8 in contact with the outer core members 5, 6 of the second pair. A conical cover 9 is rigidly connected to the baseplate 1 and covers the top of the outer core members. The inner core member 2 is rigidly connected to the conical cover 9. A second conical cover 10 covers the bottom of the outer core members 3, 4, 5, 6. FIG. 1 shows also the mold 11 and the molding 12. The mold 11 is divided into two one-half mold sections, which can be radially opened, and comprises at its top and bottom respective hollow conical surfaces 13 and 14, which respectively cooperate with the conical covers 9 and 10. As a result, the mold forces the two conical covers 9 and 10 toward each other so that the outer core members 3, 4, 5, 6 are precisely held in position. As shown in FIGS. 10 and 11, the lower conical cover 10 has a hollow conical annular rim 15, which cooperates with conical extensions 16 of the outer core members 3, 4, 5, 6. Inclined guide rods 17 are rigidly connected to the outer core members 3 and 4 and are precisely guided in guide bores 18 of the baseplate 1 and engaged by a transverse guide 19. The guide rods are provided at their upper ends with rollers 20, which consist of ball bearings. The transverse guides 19 are axially slidable along a guide 21 so that when moving downwardly they cause the rollers 20 to move radially inwardly. The outer core members 5 and 6 are rigidly connected to inclined guide rods 22, which are precisely guided in guide bores 33 of the transverse guide 19 and extend through slots 23 in the baseplate 1. The outer core members 5, 6 have guide ribs 24, into which the inclined guide rods 22 are screwed. The guide rods 22 are provided at their upper ends also with rollers 25, which consist of ball bearings and are guided in a transverse guide 26. The latter can also be displaced downwardly.

The outer core members 3, 4 have inclined surfaces 27 which are slidably guided on the inclined surfaces 7 of the inner core member 2. The latter is additionally provided with dovetail guides 28. The outer core members 5, 6 have inclined surfaces 29, which are slidably guided on the inclined surfaces 8 of the inner core member. The ribs 24 are guided in grooves 30 of the inner core member. The outer core members 3, 4 have lateral wedge faces 31, which in the position shown in FIGS. 1 to 4 lie in the same planes as the inclined surfaces 8 of the inner core member.

The central guide rod 21 is rigidly connected to the transverse guide 26 and is slidably guided in the transverse guide 19, in the base plate 1, in the conical cover 9, and in the inner core member 2. The lower end 32 of the guide rod 21 is rigidly connected to the lower conical cover 10.

FIGS. 5, 6 and 7 show the core in the position reached after the first part of the extracting movement or displacement. The transverse guide 26 has been displaced downwardly by a distance a by means of a rod 21a, which is connected to the central guide rod 21 and may consist, e.g., of the piston rod of a hydraulic actuator. During this movement the clearance b between the transverse guide 26 and the transverse guide 19 remains unchanged. The two transverse guides have been displaced by the distance a to the positions 26' and 19', respectively. The outer core members 3, 4 have been displaced downwardly and inwardly to positions 3', 4', respectively. The outer core members 5, 6 have been displaced downwardly to positions 5', 6' but have not yet been displaced inwardly because the outer core members 5, 6 have been displaced simultaneously with the outer core members 3, 4. The transverse guide 19 is now in position 19' and rests on the baseplate 1. The conical cover 10 has been moved downwardly and the rollers 20 have been moved inwardly to positions 20'. In the transverse guide 26, the rollers 25 still have the same radial distance from the central guide rod 21. The lower conical cover 10 has been displaced to position 10'. The effective radius of outer core members 3, 4 in position 3', 4' has been decreased. The effective radius of the outer core members 5, 6 in position 5', 6' has not yet been changed.

FIGS. 8 and 9 show the parts at the end of the second part of the extracting movement, when the displacement has been completed. The transverse guide 19 has remained in position 19'. The transverse guide 26 has been displaced by the distance b from position 26' to position 26" so that the rollers 25 have been moved inwardly to position 25". The outer core members 3, 4 have remained in position 3', 4'. The outer core members 5, 6 have been moved downwardly and inwardly to positions 5", 6" in the direction of the inclined guide rods 22 and along the inclined surfaces 31 of the outer core members 3, 4 and have thus been displaced downwardly by the distance b. The lower conical cover 10 has been moved downwardly to position 10".

The diameter of the core has thus been decreased in all directions so that the molding 12 is released. FIGS. 10 and 11 show that the outer core parts are formed with recesses 34, in which ribs are formed on the molding 12. The diameter of the core can be decreased to such an extent that a molding having ribs which conform to the recesses 34 can be molded and can readily be removed from the mold.

Figure 13:
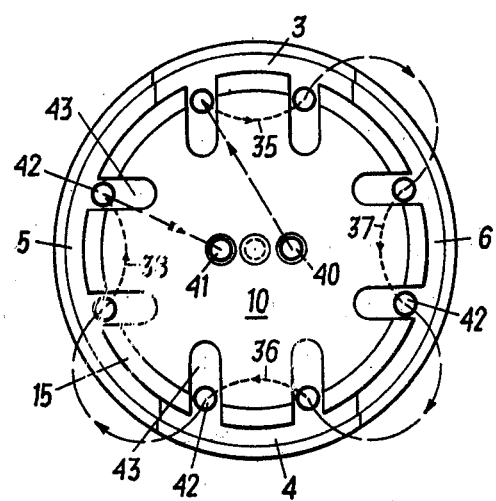
FIG. 13 is a bottom view showing the core in the closed mold, viewed from below in the direction of the arrow XIII in FIG. 10.
Figure 12:
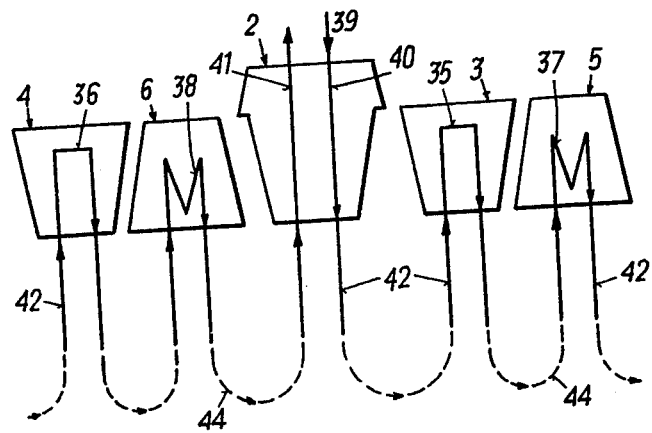
FIG. 12 is a coolant flow diagram.
Figure 14:
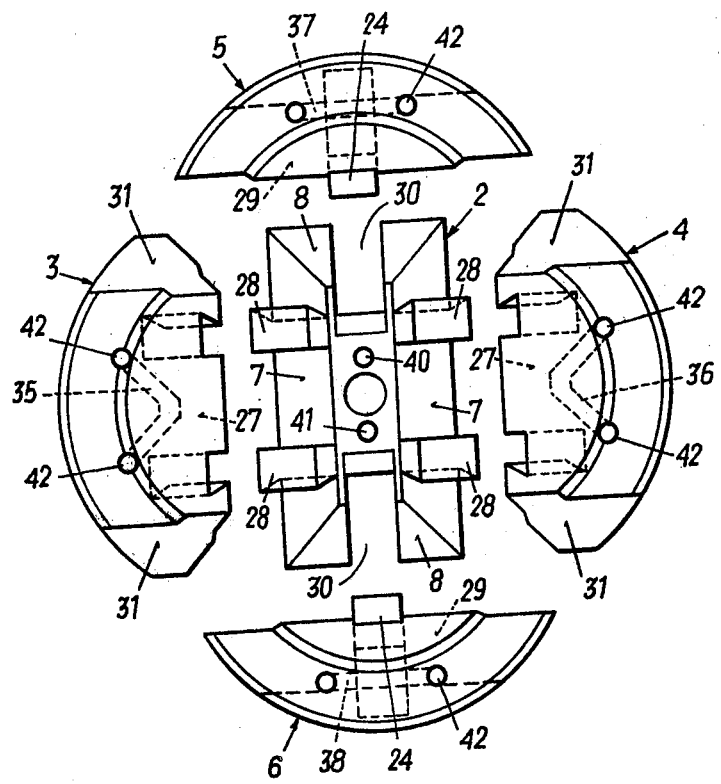
FIG. 14 shows the individual parts viewed from below.

The outer core members are provided with coolant passages 35, 36, 37, 38, which are diagrammatically indicated in FIG. 12 and shown in FIGS. 10 and 11. Cooling water is supplied from above in the direction of the arrow 39 through a passage 40 in the inner core member 2 and then flows through the coolant passages 35, 36, 37, 38 and flows back through a passage 41. The openings of the passages 35, 36, 37 and of the passages 40, 41 are disposed at their lower ends. Pipes 42 are connected to said openings and as shwon in FIG. 13 extend through slots 43 in the lower conical cover 10. The slots 43 form pairs of parallel slots, through which pipers 42 connected to respective outer core members extend so that the radial movements of these outer core members are not obstructed. The pipes 42 are interconnected by flexible tubes 44. As a result, the pipes 42 and flexible tubes 44 do not obstruct the removal of the molding 12 from the mold in a downward direction.

For the sake of clearness, the serveral parts consisting of the inner core member 2 and the outer core members 3, 4, 5, 6 are shown in an exploded view taken from underneath.

What I claim is:

1. A collapsible core for use in casting molds, particularly injection molds, for the manufacture of moldings which are formed with undercuts on their inside surface, such as sleeves, which core comprises at least one inner core member, which remains out of contact with the inside peripheral surface of the molding, four and only four outer core members arranged as first and second pairs of mutually opposite members, which engage the molding and determine the shape thereof, and guides which converge toward the axis of the core and serve to guide said pairs of outer core members parallel to guide planes which are offset 90° from each other and extend through the axis of the core, said outer core members tightly adjoining each other, the outer core members of the first pair having lateral wedge faces which extend parallel to the guides and at right angles to the guide plane of the outer core members of the second pair, the outer core members of the second pair having inclined surfaces which are disposed on the side which faces the axis and are parallel to the wedge faces of the outer core members of the first pair, the outer core members of both pairs being adapted to be displaced from a molding position in that longitudinal direction of the guides in which the latter converge, and the displacement of the outer core members of the first pair being smaller than the displacement of the outer core members of the second pair.

2. A core according to claim 1 wherein the guides include guide rods which are rigidly connected to the outer core members, the guide rods associated with the outer core members of the first pair being mounted in a baseplate and guided in the later for movement in their longitudinal direction, said guide rods having free ends which in a first transverse guide are held against movement in the axial direction of the core and are slidably guides in a radial direction, the guide rods associated with the outer core members of the second pair being guided in their longitudinal direction in the first transverse guide and having free ends which in a second transverse guide are held against movement in the axial direction of the core and are slidably guided in a radial direction, said first and second transverse guides being slidably guided in the axial direction of the core.

3. A core according to claim 2, including rollers interposed between the free ends of the guide rods and the transverse guides.

4. A core according to claims 2 or 3 including actuating means for axially displacing the outer core members, said actuating means engaging the transverse guide which cooperates with the guide rods associated with the outer core members of the second pair, the transverse guide which cooperates with the guide rods associated with the outer core members of the second pair being axially spaced from the transverse guide cooperating with the guide rods associated with the outer core members of the first pair when the core is in a molding position, and wherein the transverse guide which cooperates with the guide rods associated with the outer core members of the second pair engages and takes along the transverse guide cooperating with the guide rods associated with the outer core members of the first pair when the outer core members of the second pair have performed a first part of their axial displacement.

5. A core according to claim 4 wherein the outer core members are covered at their two axial ends by conical covers which taper outwardly and which cooperate with hollow conical surfaces of the mold when the core is in a molding position.

6. A core according to claim 5 wherein the cover which faces the free ends of the guide rods is rigidly connected to the baseplate and to the inner core member.

7. A core according to claim 5 wherein at least one of the conical covers is remote from the free ends of the guide rods which are associated with the pairs of outer core members, said one cover being formed with centering means, which include an annular centering rim and which cooperate with the outer core members of at least one pair.

8. A core according to claim 5 wherein the conical cover which is disposed near that end of the outer members that is remote from the free ends of the guide rods is connected by a central guide rod to the transverse guide which cooperates with the guide rods associated with the outer core members of the seconed pair, said central guide rod extending axially through the baseplate and the inner core member.

9. A core according to claim 4 wherein the outer core members are provided with coolant passages.

10. A core according to claim 9 wherein the coolant passages have openings in those end faces of the outer core members which are remote from the baseplate, and wherein conduits or pipes extending parallel to the axis of the core are connected to said openings.

11. A core according to claim 10 wherein the outer core members are covered at their two axial ends by conical covers which taper outwardly and which cooperate with hollow conical surfaces of the mold when the cores is in a molding position and wherein supply and return conduits for the coolant extend through the cover which faces the baseplate and through the inner core member which is remote from the baseplate, said supply and return conduits also extending through the conical cover which is remote from the baseplate, the latter cover being axially displaceable relative to said supply and return conduits.

12. A core according to claim 11 wherein the conical cover which is remote from the baseplate has slots through which pipes which are connected to the outer core members and serve to conduct the coolant extend longitudinally in the direction of the radial movement of the outer core members.

13. A core according to claim 11 wherein cooling fluid is conducted from said supply conduit through the consecutive cooling passages of the outer core members and is then returned to said return conduit.

* * * * *